May 28, 1968 R. WEST 3,385,218

HYDRAULIC PUMP SYSTEM

Filed May 18, 1966

ROBERT WEST INVENTOR.

BY John G. Kovalich
Agent

United States Patent Office 3,385,218
Patented May 28, 1968

3,385,218
HYDRAULIC PUMP SYSTEM
Robert West, 73 Wayne Blvd.,
Madison, N.J. 07940
Filed May 18, 1966, Ser. No. 551,009
4 Claims. (Cl. 103—26)

ABSTRACT OF THE DISCLOSURE

A hydraulic system employing a switch which controls an electric motor driven pump. The switch housing provides two chambers and a float in each chamber. One float actuates a switch and the other float valves a passage in the first chamber to effect the filling and emptying of the first chamber.

---

The present invention deals with a hydraulic pump system and more particularly with a hydraulic pump system for the automatic drainage of liquids from a pre-selected liquid level.

There are various known float type systems for indicating or controlling liquid levels. Such known systems are usually characterized by apparatus operable in connection with a contained vertical liquid column carrying a float which travels continuously during the filling and during the draining of liquid from its container. The float is usually associated with electrical indicating or control means which is activated by the float at different levels and requires a float movement substantially co-extensive with the degree of rise and fall of the liquid column being controlled or drained. When the height of the liquid column is to be maintained within narrow limits, there is no particular problem since the float operated control means can be made small and compact. However, when substantially complete drainage from a container or reservoir is of prime consideration, the float travels along the entire distance from the pre-selected upper level down to the bottom of the container or reservoir being drained. In such case, float type control systems are disadvantageously bulky and are not efficiently operable especially, for example for sump pump operation, or for the drainage of tanks.

The present invention contemplates a comparatively small compact float operated control unit which operates with an established pre-set short stroke float movement regardless of the depth of a liquid being drained from one level to another, or for substantially complete drainage of a reservoir or vessel from a pre-selected liquid level.

It is an object of the invention to provide an easily installed compact automatic hydraulic pump system which requires practically no mechanical or electrical adjustment for various selected liquid levels, practically no maintenance, and which is applicable for a large variety of liquid level or drainage operations.

Figure 1:
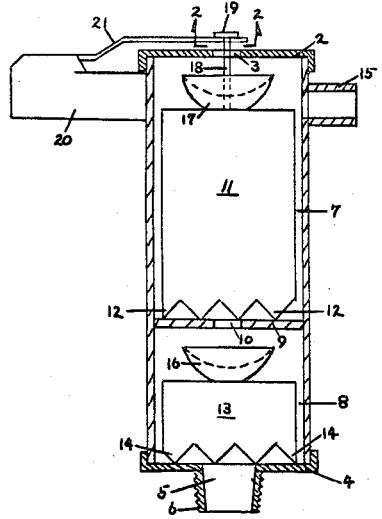
Figure 2:
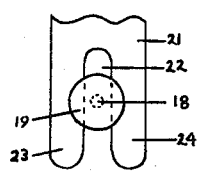
Figure 3:
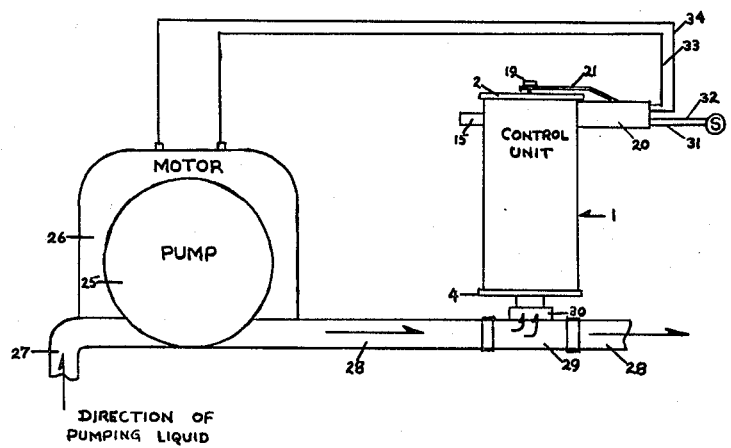

Other objects and advantages of the invention will become apparent from the description hereinafter following and the drawings forming a part hereof, in which:

FIGURE 1 illustrates a partly elevational and partly cross-sectional view of a float operated control unit according to the invention, FIGURE 2 illustrates a view along lines 2—2 of FIGURE 1, and FIGURE 3 illustrates a schematic view of a hydraulic pump system according to the invention.

Regarding FIGURES 1 and 2, the hydraulic pump system of the invention incorporates a float-operated control unit comprising a tubular housing 1 operatively disposed in a vertical position. The tubular housing is provided with a cap means 2 enclosing its top opening. As hereinafter more particularly described, the top cap 2 is advantageously provided with a small control aperture 3 formed therethrough. The bottom opening of the housing is capped with a bottom cap 4 having a central opening 5 with an externally threaded tubular nipple 6 formed integrally with the cap and extending outwardly therefrom axially of the opening 5. The interior of the housing is divided into upper and lower chambers 7 and 8, respectively, by means of septum 9 preferably located a greater distance from the top of the housing than from the bottom of the housing so that upper chamber 7 is of greater volume than lower chamber 8. An opening 10 is provided through the septum 9 preferably centrally thereof. A first float 11, having spacing projections or legs 12 depending from the bottom thereof, is mounted in the upper chamber 7. A second smaller float 13, having spacing projections or legs 14 depending from its bottom, is mounted in the lower chamber 8. An upper portion of the housing is provided with an inlet 15 substantially adjacent the top cap 2 and communicating with upper chamber 7. The second float 13 has a closure means 16 operatively associated therewith and functioning to close the opening 10 in septum 9. For example, the closure means may be in the form of a suction cup mounted on float 13 and engageable with septum 9 while encompassing and enclosing the opening 10. Otherwise, the closure means may be a stopper or the like insertable into the opening 10. The first float 11 is also preferably provided with a closure means 17 in the form of a suction cup as illustrated, or a stopper, mounted thereon and engageable with the top cap 2 while encompassing and closing the aperture 3. A switch pin 18 having a head 19 is mounted on an upper portion of the first float 11 with the pin passing through aperture 3 and the head 19 being positioned externally of the housing above cap 2. As illustrated, the end of the pin 18 opposite head 19 is attached to the top of float 11 centrally through closure means 17. A switch, e.g. microswitch 20, is mounted on a side of housing 1 near the cap 2. The switch comprises an actuating armature or arm 21 the terminal free end portion of which is slotted as at 22 thereby providing terminal legs 23 and 24 so that a portion of pin 18 below head 19 and externally of the housing 1 is movably positioned in the slot 22 between legs 23 and 24 and with the head 19 engageable with the top surface of the arm 21.

Regarding FIGURE 3, the control unit comprising housing 1 and switch 20 is connected to a hydraulic pump system comprising a hydraulic pump means 25 operated by electrical motor 26 interconnected therewith according to known construction. An inlet conduit 27 is connected into the inlet side pump 25 and an outlet conduit 28 is connected to the pressure side or outlet side of pump 25. A T-shaped conduit 29 is connected into conduit 28 with the tubular leg 30 thereof threadedly connected to the nipple 6 of FIGURE 1. A source of electrical energy S is connected to the microswitch 20 by electrical leads 31 and 32 and electrical leads 33 and 34 connect the switch 20 to pump motor 26.

In operation, the entire pump system can be made suitably compact and can be mounted in a well (not shown) of the usual type adapted for sump pump operation with the inlet 15 of housing 1 located at a pre-selected level from which level the well is to be drained. The pump system is operable regardless of the depth of the well since it is only necessary to locate the inlet end of the pump inlet conduit 27 at any desirable location in the well and the discharge end of outlet conduit outside the well. The system is equally operable for draining tanks, reservoirs and the like so long as the housing inlet 15 and conduits 27 and 28 are suitably located for controlled degree of drainage or complete drainage. Having been suitably mounted, the pump system is inoperative until such time as a liquid level is sufficiently high to permit the liquid to enter the inlet 15. Thereafter, the liquid flows into inlet 15, into the upper chamber 7 and between the legs 12 of float 11 through opening 10 of septum 9 to fill the lower chamber 8. When the lower chamber 8 is being filled, the float 13 rises until the closure means 16 closes the opening 10 and the liquid continues to rise upwardly into upper chamber 7. As upper chamber 7 is being filled, the float 11 rises until the closure means 17 of float 11 approaches and subsequently closes the aperture 3 of cap 2. When the float 11 rises sufficiently, the head 19 of the pin 18 rises until it disengages from the switch arm 21 at which time the switch arm 21 is released and actuates microswitch 20. Upon actuation of the microswitch, the electrical circuit to motor 26 is opened and the motor is started to operate the pump 25. Upon operation of the pump, liquid from a level enters pump conduit 27 and passes outwardly of the pump through outlet conduit 28. When liquid flows through conduit 28, a hydraulic back pressure is exerted against lower float 13 through the nipple 6 and both chambers 8 and 7 are maintained in liquid filled condition. The pumping operation continues until the liquid level falls below the inlet end of pump inlet conduit 27. At such time, when there is no longer any liquid available to pump 25, the liquid pressure in conduit 28 is reduced causing the liquid in chamber 8 to drain into outlet conduit 28. When chamber 8 is being so drained, the float 13 drops downwardly carrying the closure means and thereby opening the opening 10. The liquid from chamber 7 now drains into chamber 8 through opening 10 and between the float legs 14 until float 11 lowers to open the aperture 3 of cap 2 and simultaneously, the head 19 of pin 18 depresses against the upper surface of switch arm 21 thereby closing the switch 20 and the electrical circuit to the pump motor 26. When the electrical circuit is closed, the pump system is inoperative until the liquid level of the well or container again rises to the pre-selected level of housing inlet 15 and the pump cycle is again activated as described.

While the pump system is described with a specifically illustrated float activated switch means, it is understood that any known switch mechanism may be employed for the equivalent function in combination with the pump control unit of the invention.

Various other modifications of the invention are contemplated within the scope of the appended claims.

What is claimed is:
1. A hydraulic pump system comprising a housing having an inlet and an outlet, a septum internally of the housing providing upper and lower chambers in the housing, said inlet communicating with said upper chamber and said outlet communicating with said lower chamber, an opening through said septum, a first float means in the upper chamber, a second float means in the lower chamber, closure means operatively associated with said second float means for closing and opening said septum opening, a switch means mounted on said housing, switch actuating means operatively associated with said first float and engageable with said switch means, an electrically operated hydraulic pump means, said switch means being electrically connected to said hydraulic pump means, an elongated pump inlet conduit communicating with said pump means, a pump outlet conduit communicating with said pump means, and said housing outlet means communicating with said pump outlet conduit.

2. A hydraulic pump system according to claim 1, wherein said housing is a tubular housing enclosed by upper and lower caps, an aperture through said upper cap, said switch actuating means being mounted on said first float means and passing through said aperture into contact with said switch means, and said housing outlet being an opening through said lower cap.

3. A hydraulic pump system according to claim 1, wherein said closure means is a suction cup carried by said second float means.

4. A hydraulic pump system according to claim 1, comprising electrical input means connected to said switch means, and electrical circuit means leading from said switch means to said electrically operated hydraulic pump means.

References Cited
UNITED STATES PATENTS

| 1,518,890 | 12/1924 | Aikman | 103—26 |
| 1,779,353 | 10/1930 | Becker | 73—3 |
| 2,765,743 | 10/1956 | Hollinshead | 103—25 |
| 2,772,331 | 11/1956 | Carothers | 200—84 |
| 2,955,173 | 10/1960 | Kranz | 103—26 |
| 3,318,247 | 5/1967 | Yost | 103—25 |

WILLIAM L. FREEH, *Primary Examiner.*